United States Patent
Yang et al.

(10) Patent No.: US 10,852,198 B2
(45) Date of Patent: Dec. 1, 2020

(54) TEMPERATURE SENSOR OF THERMAL MONITORING SYSTEM FOR USE IN POWER DISTRIBUTION SYSTEMS

(71) Applicant: Siemens Industry, Inc., Alpharetta, GA (US)

(72) Inventors: Guang Yang, Suwanee, GA (US); Solomon R Titus, Cumming, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 249 days.

(21) Appl. No.: 16/111,687

(22) Filed: Aug. 24, 2018

(65) Prior Publication Data

US 2020/0064207 A1  Feb. 27, 2020

(51) Int. Cl.

| | |
|---|---|
| *G01K 13/00* | (2006.01) |
| *G01K 7/02* | (2006.01) |
| *G01K 1/16* | (2006.01) |
| *G01K 7/04* | (2006.01) |

(52) U.S. Cl.
CPC .............. *G01K 7/023* (2013.01); *G01K 1/16* (2013.01); *G01K 7/04* (2013.01); *G01K 13/00* (2013.01)

(58) Field of Classification Search
CPC  G01K 7/01; G01K 7/00; G01K 13/00; G01K 2217/00; G01K 1/143; G01K 7/226; G01K 17/00; G01K 17/06; G01K 2003/145; G01K 7/023; G01N 2201/12
USPC ....... 374/170, 175, 179, 141, 4, 5, 208, 165, 374/163, 152
See application file for complete search history.

(56) References Cited

U.S. PATENT DOCUMENTS

| | | | | |
|---|---|---|---|---|
| 4,720,303 | A * | 1/1988 | Soldatos | C08L 1/28 106/181.1 |
| 5,742,464 | A * | 4/1998 | Ceola | H01R 13/7137 361/103 |
| 7,416,332 | B2 * | 8/2008 | Rountree | G01K 1/14 257/180 |
| 7,701,222 | B2 * | 4/2010 | Cases | G01J 5/0096 324/501 |

(Continued)

FOREIGN PATENT DOCUMENTS

| | | | | |
|---|---|---|---|---|
| FR | 2050063 | A5 | 3/1971 | |
| GB | 2308446 | A * | 6/1997 | ............... G01K 1/16 |

(Continued)

*Primary Examiner* — Gail Kaplan Verbitsky

(57) ABSTRACT

A temperature sensor of a thermal monitoring system is provided for use in power distribution systems. The temperature sensor comprises ceramic printed circuit board (PCB) and a terminal. The ceramic PCB includes a temperature sensing element disposed on a side of the ceramic PCB. The terminal is configured to be fixed directly in contact with a measured point and is directly in touch with the ceramic PCB such that heat is conducted from the terminal, through the ceramic PCB and then to the temperature sensing element. The temperature sensing element is configured to generate an electrical signal in response to the heat such that the electrical signal is sent through a pair of lead wires to a controller for monitoring a temperature. The temperature sensor further comprises an epoxy to seal a portion of the terminal, the ceramic PCB in its entirety and a portion of the pair of lead wires to ensure a desired physical strength and a desired dielectric strength.

20 Claims, 2 Drawing Sheets

(56) References Cited

U.S. PATENT DOCUMENTS

| | | | |
|---|---|---|---|
| 8,540,422 B2 * | 9/2013 | Edwardson | G01R 31/281 324/500 |
| 9,564,719 B1 * | 2/2017 | Oldham | H01R 43/24 |
| 10,122,161 B2 * | 11/2018 | Baldwin | H02G 5/06 |
| 2002/0048308 A1 * | 4/2002 | Knittel | G01K 1/20 374/141 |
| 2007/0006603 A1 * | 1/2007 | Reusche | H01R 13/7137 62/196.4 |
| 2008/0094210 A1 * | 4/2008 | Paradiso | H04L 12/2827 340/540 |
| 2010/0186496 A1 * | 7/2010 | Galley | G01P 13/006 73/170.06 |
| 2012/0082180 A1 * | 4/2012 | Edwardson | G01R 31/281 374/57 |
| 2014/0269821 A1 * | 9/2014 | Egley | G01K 7/023 374/54 |
| 2015/0060940 A1 * | 3/2015 | Muto | H01L 25/165 257/140 |
| 2019/0097399 A1 * | 3/2019 | Baldwin | H02B 1/20 |

FOREIGN PATENT DOCUMENTS

| | | | | |
|---|---|---|---|---|
| JP | 360039573 | A | * | 3/1985 |
| JP | 2016161434 | A | | 9/2016 |
| JP | 2018119850 | A | | 8/2018 |
| KR | 20160067415 | A | * | 6/2016 |

* cited by examiner

TEMPERATURE SENSOR OF THERMAL MONITORING SYSTEM FOR USE IN POWER DISTRIBUTION SYSTEMS

BACKGROUND

1. Field

Aspects of the present invention generally relate to a temperature sensor of a thermal monitoring system for use in power distribution systems. The temperature sensor comprises a thermally conductive, electrically insulating ceramic material. The temperature sensor uses a direct contact to a measured joint and uses wired connections to transmit a signal.

2. Description of the Related Art

Abnormal situations, such as faulty installation and overloading, can cause substantial thermal rise in power distribution systems. Therefore, there is a need to have a continuous thermal monitoring system to monitor temperature rise in power connection joints, lugs and cables in various installation components. As an important part of the thermal monitoring system, a temperature sensor is needed. The temperature sensor needs to be easily installable, reliably sensing temperatures at a measured point, capable of withstanding the required system voltage and within a reasonable price range.

There are three kinds of sensor design concepts that have been implemented in the market. First kind of thermal monitoring systems use infrared (IR) sensors for temperature sensing. The infrared sensor is not in direct touch to the high voltage system, therefore eliminates concerns on electric breakdown. And such systems are generally more cost friendly. However, the measured joints need to be painted to certain colors, usually black, and the painting process is not user friendly. Also, the IR sensor can also pick up signals emitted by other than the measured joint, which can skew the measurement.

To avoid these drawbacks of IR sensors, second kind of thermal monitoring systems use a thermal sensor in a direct contact with the measure joint, and the sensing is done with thermocouples or components alike. To avoid electric breakdown due to the high system voltage, there have been two ways to transmit signals between the sensors and the control system. First is to use fiber optics to transmit the temperature signal back to the controller. While achieving the requirements, such sensor design can be costly to the end customers. Second is to use battery to send signal from temperature sensors through wireless connections. Such method requires battery powered thermal sensors to generate an active signal, and hence has the drawback of having to replace the battery for maintenance. It also has to ensure good wireless connections for reliable signal reading.

Third kind of thermal monitoring systems use RF powered temperature sensors. In such systems, one or more antennas are used to send RF signals to the sensors attached to the measured joints. At different temperatures, the sensors reflect the RF signal with different frequencies, but detecting the change in the reflected frequency, the temperature can be detected. Such systems are also costly and sensitive to the antenna-sensor arrangements.

Therefore, there is an ongoing need for a suitable temperature sensor of a thermal monitoring system for use in power distribution systems that is capable of providing a reliable temperature reading while being cost friendly.

SUMMARY

Briefly described, aspects of the present invention relate to a temperature sensor of a thermal monitoring system for use in power distribution systems that is capable of providing a reliable temperature reading while being cost friendly. The proposed sensor uses a direct contact to a measured joint, and uses wired connections to transmit a signal. Therefore, concerns on receiver arrangements (wireless, RF or IR) are eliminated. The temperature sensor comprises a thermally conductive, electrically insulating ceramic material. A ceramic printed circuit board (PCB) has a reasonable price point therefore utilizing such material significantly drives down the cost of the temperature sensor. The use of the ceramic PCB makes the temperature sensor more cost friendly when compared to fiber optics and all the other concepts.

In accordance with one illustrative embodiment of the present invention, a temperature sensor of a thermal monitoring system is provided for use in power distribution systems. The temperature sensor comprises a ceramic printed circuit board (PCB) having a first side and a second side. The ceramic PCB includes a temperature sensing element disposed on the second side of the ceramic PCB. The temperature sensor further comprises a terminal having a first end and a second end. The first end of the terminal is configured to be fixed directly in contact with a measured point and the second end of the terminal is directly in touch with the first side of the ceramic PCB such that heat is conducted from the terminal, through the ceramic PCB and then to the temperature sensing element. The temperature sensing element is configured to generate an electrical signal in response to the heat. The temperature sensor further comprises a pair of lead wires. The electrical signal generated by the temperature sensing element is sent through the pair of lead wires to a controller for monitoring a temperature. The temperature sensor further comprises an epoxy to seal a portion of the terminal, the ceramic PCB in its entirety and a portion of the pair of lead wires to ensure a desired physical strength and a desired dielectric strength.

In accordance with one illustrative embodiment of the present invention, a thermal monitoring system for use in power distribution systems. The thermal monitoring system comprises a controller for temperature monitoring and a temperature sensor coupled to the controller. The temperature sensor comprises a ceramic printed circuit board (PCB) having a first side and a second side. The ceramic PCB includes a temperature sensing element disposed on the second side of the ceramic PCB. The temperature sensor further comprises a terminal having a first end and a second end. The first end of the terminal is configured to be fixed directly in contact with a measured point and the second end of the terminal is directly in touch with the first side of the ceramic PCB such that heat is conducted from the terminal, through the ceramic PCB and then to the temperature sensing element. The temperature sensing element is configured to generate an electrical signal in response to the heat. The temperature sensor further comprises a pair of lead wires. The electrical signal generated by the temperature sensing element is sent through the pair of lead wires to a controller for monitoring a temperature. The temperature sensor further comprises an epoxy to seal a portion of the terminal, the ceramic PCB in its entirety and a portion of the pair of lead wires to ensure a desired physical strength and a desired dielectric strength.

DETAILED DESCRIPTION

To facilitate an understanding of embodiments, principles, and features of the present invention, they are explained hereinafter with reference to implementation in illustrative embodiments. In particular, they are described in the context of a temperature sensor (with epoxy or plastic material) of the thermal monitoring system for use in the power distribution systems. The temperature sensor comprises a ceramic printed circuit board (PCB) made of a thermally conductive, electrically insulating ceramic material. The temperature sensor uses a direct contact to a measured joint and uses wired connections to transmit a signal. The temperature sensor provides a continuous thermal monitoring system to monitor a temperature rise in power connection joints, lugs and cables in various installation components. The temperature sensor is easily installable, reliably senses temperatures at a measured point, capable of withstanding any required system voltage and within a reasonable price range. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
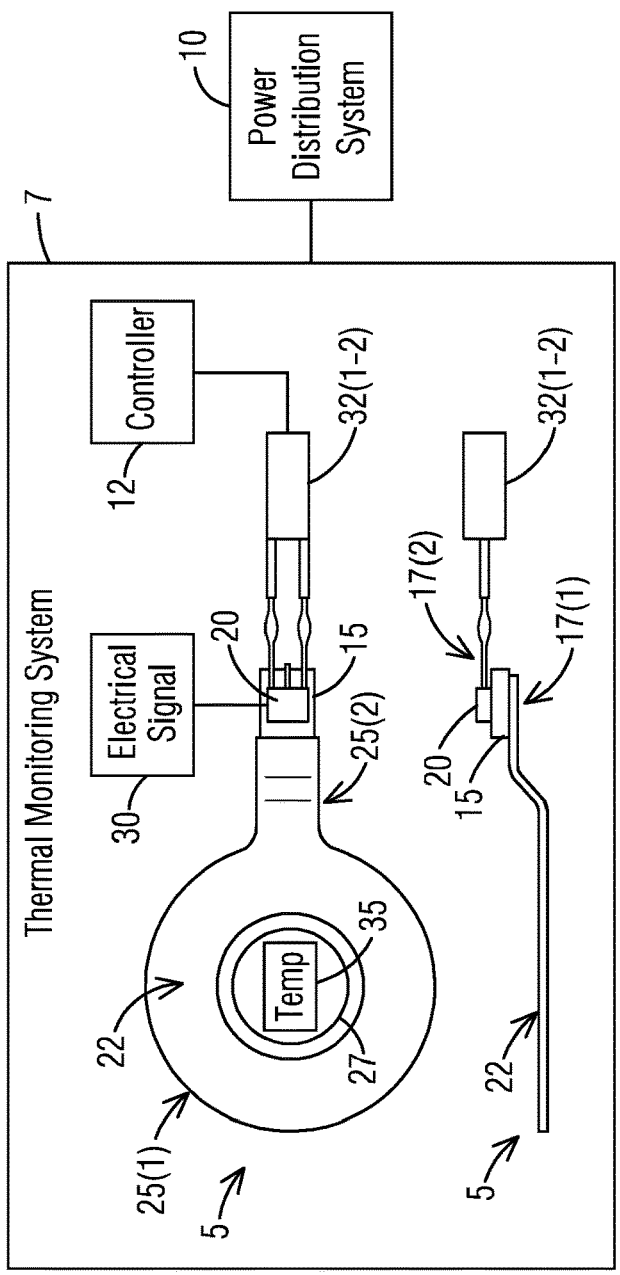
FIG. 1 illustrates a top and a side view of a temperature sensor (without epoxy or plastic material) of a thermal monitoring system for use in power distribution systems in accordance with an exemplary embodiment of the present invention.

Consistent with one embodiment of the present invention, FIG. 1 represents a representation of a temperature sensor (without epoxy or plastic material) 5 of a thermal monitoring system 7 for use in a power distribution system 10 in accordance with an exemplary embodiment of the present invention. The thermal monitoring system 7 comprises a controller 12 for temperature monitoring. The thermal monitoring system 7 comprises the temperature sensor 5 coupled to the controller 12 (although this generally is a correct illustration, our exact setup is that each sensor goes to a module, and a group of modules are connected to one controller). The temperature sensor 5 includes a ceramic printed circuit board (PCB) 15 having a first side 17(1) and a second side 17(2). The ceramic PCB 15 includes a temperature sensing element 20 disposed on the second side 17(2) of the ceramic PCB 15. The temperature sensor 5 includes a terminal 22 having a first end 25(1) and a second end 25(2). The first end 25(1) of the terminal 22 is configured to be fixed directly in contact with a measured point 27 and the second end 25(2) of the terminal 22 is directly in touch with the first side 17(1) of the ceramic PCB 15 such that heat is conducted from the terminal 22, through the ceramic PCB 15 and then to the temperature sensing element 20.

For example, the ceramic PCB 15 may be made of a ceramic material that is an inorganic, non-metallic, often crystalline oxide, nitride or carbide material. Some elements, such as carbon or silicon, may be considered ceramics. Ceramic materials are brittle, hard, and strong in compression, weak in shearing and tension. The crystallinity of ceramic materials ranges from highly oriented to semi-crystalline, vitrified, and often completely amorphous (e.g., glasses). Most often, fired ceramics are either vitrified or semi-vitrified. Varying crystallinity and electron consumption in the ionic and covalent bonds cause most ceramic materials to be good thermal and electrical insulators. Ceramics generally can withstand very high temperatures, such as temperatures that range from 1,000° C. to 1,600° C. (1,800° F. to 3,000° F.). Glass is often not considered a ceramic because of its amorphous (non-crystalline) character. However, glassmaking involves several steps of the ceramic process and its mechanical properties are similar to ceramic materials. Crystalline ceramic materials are not amenable to a great range of processing. The glass is shaped when either fully molten, by casting, or when in a state of toffee-like viscosity, by methods such as blowing into a mold. If later heat treatments cause this glass to become partly crystalline, the resulting material is known as a glass-ceramic.

The physical properties of a ceramic substance of the ceramic PCB 15 are a direct result of its crystalline structure and chemical composition. Solid state chemistry reveals the fundamental connection between microstructure and properties such as localized density variations, grain size distribution, type of porosity and second-phase content, which can all be correlated with ceramic properties such as mechanical strength a by the Hall-Petch equation, hardness, toughness, dielectric constant, and the optical properties exhibited by transparent materials. Mechanical properties are important in structural and building materials as well as textile fabrics. They include many properties used to describe the strength of materials such as: elasticity/plasticity, tensile strength, compressive strength, shear strength, fracture toughness & ductility (low in brittle materials), and indentation hardness. Some ceramics are semiconductors. Most of these are transition metal oxides that are II-VI semiconductors, such as zinc oxide. For example, the ceramic PCB 15 may be made of a ceramic material that has a high dielectric strength and a high thermal conductivity.

In operation, the temperature sensing element 20 is configured to generate an electrical signal 30 in response to the heat. The temperature sensor 5 further includes a pair of lead wires 32(1-2). The electrical signal 30 generated by the temperature sensing element 20 is sent through the pair of lead wires 32(1-2) to the controller 12 for monitoring a temperature 35. The terminal 22 comprises a material with high thermal conductivity. The terminal 22 is configured to conduct the heat from the measured point 27 to the temperature sensing element 20 and the terminal 22 provides a means to connect the temperature sensor 5 to the measured point 27. The terminal 22 may be a ring lug which is configured to be bolted onto the measured point 27. The terminal 22 may be a cylindrical tube which is configured to be attached to cables with wire ties.

The temperature sensor 5 further includes an epoxy (not shown) to seal a portion of the terminal 22, the ceramic PCB 15 in its entirety and a portion of the pair of lead wires 32(1-2) to ensure a desired physical strength and a desired dielectric strength. The epoxy is either an insulating epoxy or a plastic material. The epoxy serves as a mechanical stress relief when the temperature sensor 5 is being handled.

The ceramic PCB 15 provides a dielectric insulation between the terminal 22 being a high voltage part and the temperature sensing element 20 being a low voltage part. The ceramic PCB 15 provides heat conduction from the terminal 22 to the temperature sensing element 20. The ceramic PCB 15 comprises a material with high thermal conductivity. For example, the material with high thermal conductivity may be aluminum nitride.

To ensure good heat conduction both the terminal 22 and the temperature sensing element 20 are directly soldered to the ceramic PCB 15. A heat conducting grease (not shown) may be disposed in between the terminal 22 and the ceramic PCB 15 and in between the temperature sensing element 20 and the ceramic PCB 15. In one embodiment, the temperature sensing element 20 may be a sensing chip, such as TI LMT01.

The temperature sensing element 20 may be a thermocouple. This thermocouple may be an electrical device consisting of two dissimilar electrical conductors forming electrical junctions at differing temperatures. Such thermocouple produces a temperature-dependent voltage as a result of the thermoelectric effect, and this voltage can be interpreted to measure temperature. The thermocouple may be self powered and require no external form of excitation. When different metals are joined at the ends and there is a temperature difference between the joints, a magnetic field is observed. The magnetic field is due to a thermo-electric current. The voltage generated at a single junction of two different types of wire is what is of interest as this can be used to measure temperature at very high and low temperatures. The magnitude of the voltage depends on the types of wire being used. Generally, the voltage is in the microvolt range and care must be taken to obtain a usable measurement from a very little current flow. In the standard configuration for thermocouple usage, the desired temperature $T_{sense}$ is obtained using three inputs—the characteristic function $E(T)$ of the thermocouple, the measured voltage V, and the reference junctions' temperature $T_{ref}$. The solution to the equation $E(T_{sense})=V+E(T_{ref})$ yields $T_{sense}$. The measured voltage V can be used to calculate temperature $T_{sense}$ provided that temperature $T_{ref}$ is known. To obtain the desire measurement of $T_{sense}$, it is not sufficient to just measure V. The temperature at the reference junctions $T_{ref}$ must be already known. Thermocouples as measurement devices are characterized by a precise $E(T)$ curve, independent of any other details. Characteristic functions for thermocouples that reach intermediate temperatures, as covered by nickel-alloy thermocouple types E, J, K, M, N, T.

The ceramic PCB 15 serves two purposes. First, it provides dielectric insulation between the high voltage part (the terminal 22) and the low voltage part (temperature sensing element 20). Second, it provides heat conduction from the terminal 22 to the sensing element 20. Ceramic in general has a wide range of thermal conductivities. To achieve good heat conduction, a material with high thermal conductivity, such as aluminum nitride, should be used. Also to ensure good heat conduction, both the terminal 22 and the temperature sensing element 20 are directly soldered to the ceramic PCB 15. If solder is not used, a heat conducting grease or alike may be used in between components. The temperature sensing element 20 can be either a thermocouple or other type of the temperature sensor. The electrical signal 30 generated by the temperature sensing element 20 is then transmitted through the pair of lead wires 32(1-2) to the controller 12 for temperature monitoring.

Figure 2:
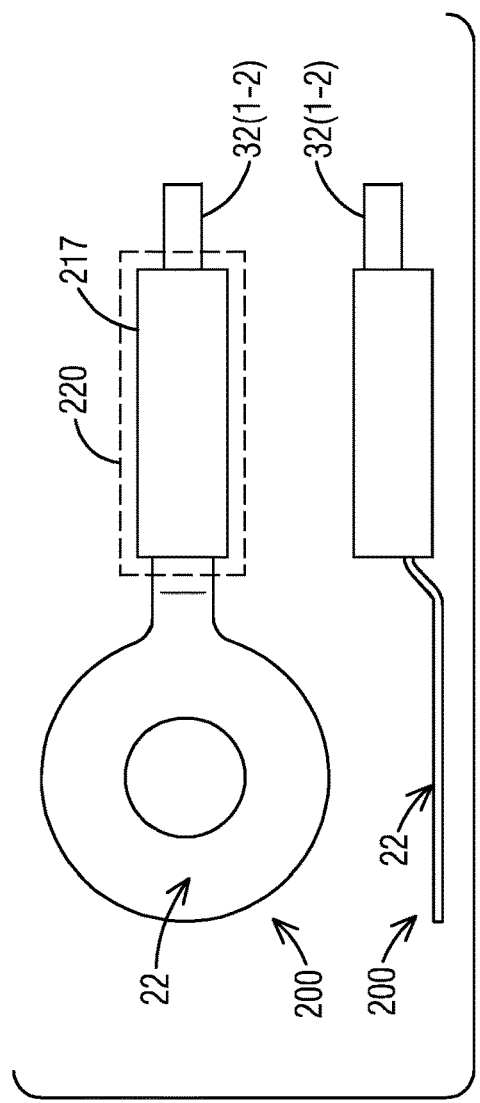
FIG. 2 illustrates a top and a side view of a temperature sensor (with epoxy or plastic material) of the thermal monitoring system for use in the power distribution systems in accordance with an exemplary embodiment of the present invention.

Referring to FIG. 2, it illustrates a representation of a temperature sensor 200 (with epoxy or plastic material) of the thermal monitoring system 7 for use in the power distribution system 10 in accordance with an exemplary embodiment of the present invention. The temperature sensor 5 further includes an epoxy 217 to seal a portion of the terminal 22, the ceramic PCB 15 in its entirety and a portion of the pair of lead wires 32(1-2) to ensure a desired physical strength and a desired dielectric strength. The epoxy 217 is either an insulating epoxy used for sealing or a plastic material in that sealing is done through an injection molding process. The epoxy 217 serves as a mechanical stress relief when the temperature sensor 5 is being handled. The temperature sensor 200 further comprises a plastic housing 220 disposed around the epoxy 217.

Figure 3:
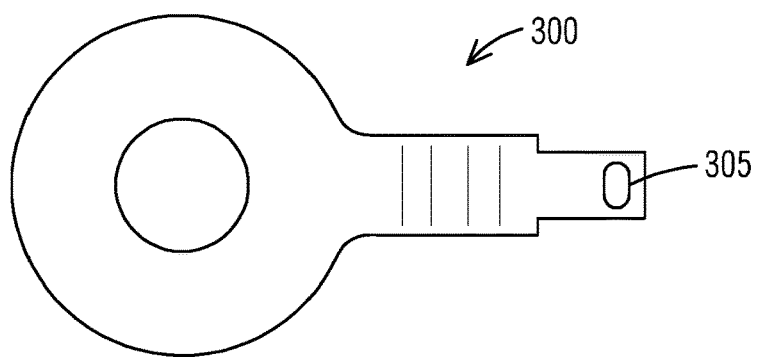
FIG. 3 illustrates a top view of a ring lug design of a terminal for bolt-on applications in accordance with an exemplary embodiment of the present invention.

Turning now to FIG. 3, it illustrates a top view of a ring lug design 300 of the terminal 22 for bolt-on applications in accordance with an exemplary embodiment of the present invention. A portion of the ring lug design 300 of the terminal 22 that is inside the epoxy 217 has a holding slot 305 which is filled with epoxy such that when the terminal 22 is pulled the holding slot 305 directly acts on the epoxy 217 instead of relying on a surface bond in order to ensure a force is not acted on a PCB joint.

Figure 4:
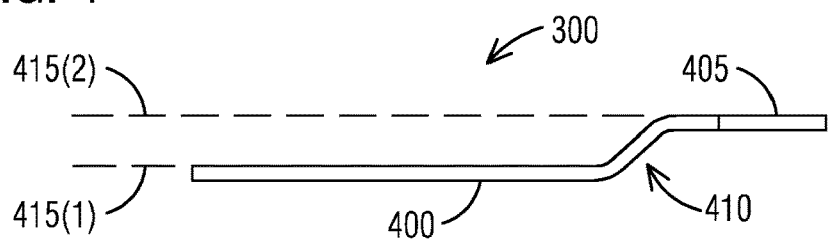
FIG. 4 illustrates a side view of the ring lug design of the terminal of FIG. 3 in accordance with an exemplary embodiment of the present invention.

FIG. 4 illustrates a side view of the ring lug design 300 of the terminal 22 of FIG. 3 in accordance with an exemplary embodiment of the present invention. The ring lug design 300 may comprise a ring 400 and a stem 405 extending away from the ring 400. The ring 400 and the stem 405 may be made of a metal or a metal alloy such as copper or aluminum. The ring lug design 300 may comprise a bend 410 in between the ring 400 and the stem 405 such that the ring 400 and the stem 405 may not be at a same level. In particular, the ring 400 will be at a lower level 415(1) than a level 415(2) of the stem 405 when the temperature sensor 5 or 200 is laid flat on a surface.

Figure 5:
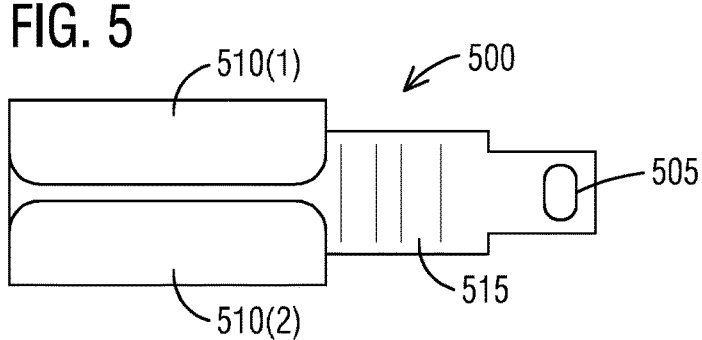
FIG. 5 illustrates a top view of a tube design of a terminal for wire tie applications in accordance with an exemplary embodiment of the present invention.

As seen in FIG. 5, it illustrates a top view of a tube design 500 of the terminal 22 for wire tie applications in accordance with an exemplary embodiment of the present invention. A portion of the tube design 500 of the terminal 22 that is inside the epoxy 217 has a holding slot 505 which is filled with epoxy. The tube design 500 may comprise a pair of wings 510(1-2) and a stem 515 extending away from the pair of wings 510(1-2). The pair of wings 510(1-2) and the stem 515 may be made of a metal or a metal alloy such as copper or aluminum. The tube design 500 may comprise a bend 520 (see FIG. 6) in between the pair of wings 510(1-2) and the stem 515 such that the pair of wings 510(1-2) and the stem 515 may not be at a same level. In particular, the pair of wings 510(1-2) will be at a lower level that the stem 515 when the temperature sensor 5 or 200 is laid flat on a surface.

Figure 6:
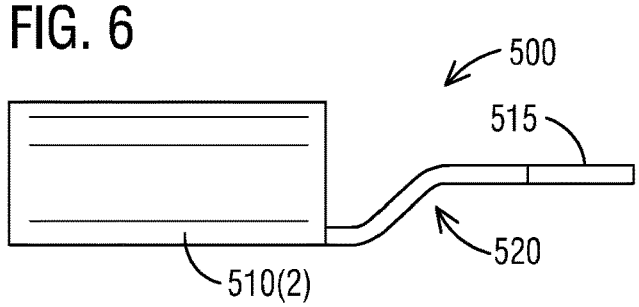
FIG. 6 illustrates a side view of the tube design of the terminal of FIG. 5 in accordance with an exemplary embodiment of the present invention.

As shown in FIG. 6, it illustrates a side view of the tube design 500 of the terminal 22 of FIG. 5 in accordance with an exemplary embodiment of the present invention. The terminal 22 serves two purposes. First, it conducts heat from the measured point 27 to the temperature sensing element 20, and hence should be made of material with high thermal conductivity, such as copper. Second, it provides a means to connect the temperature sensor 5 to the measured point 27. In one configuration, as shown in FIG. 3, the terminal 22 is a ring lug, which can be bolted onto the measured joint 27. In another configuration, as shown in FIG. 5, the terminal 22 is a cylindrical tube, which can be attached to cables with wire ties.

Figure 7:
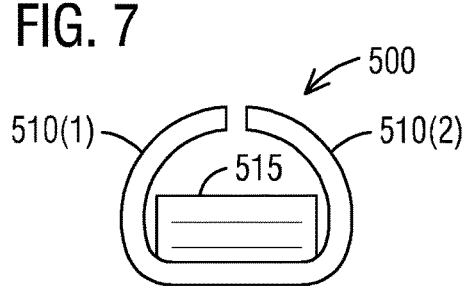
FIG. 7 illustrates a front view of the tube design of the terminal of FIG. 5 in accordance with an exemplary embodiment of the present invention.

In FIG. 7, it illustrates a front view of the tube design 500 of the terminal of FIG. 5 in accordance with an exemplary embodiment of the present invention. In the tube design 500 the pair of wings 510(1-2) form a cylindrical tube which can be attached to cables with wire ties.

An important technical challenge to address is the high dielectric strength needed. To ensure that, a part of the terminal 22, the whole ceramic PCB 15 and a part of the pair of lead wires 32(1-2) are sealed in an insulating epoxy. The epoxy 217 chosen has a high dielectric strength to create enough isolation between the low voltage parts inside and the high voltage part outside. The insulating epoxy can also serve as mechanical stress relief when the temperature sensor 5, 200 is being handled. An example is shown in FIG. 3. The portion of the terminal 22 that is inside the epoxy 217 has the holding slot 305, which is filled with epoxy, instead of being flat. Therefore, when the terminal 22 is pulled, the holding slot 305 can directly act on the epoxy 217, instead of relying on a surface bond, and can ensure the force is not acted on the PCB joint. Similar concepts can also be used on the lead wire side, although not shown here. Epoxy can be chosen to have high bonding force with the wire insulation, or middle components, such as crimps or terminals, can be used to isolate the joint on the ceramic PCB 15. If further strength is needed, the plastic housing 220 can be used around the epoxy.

Products such as panel boards, switchboards, switchgears, bus bar systems etc are integrated with energy monitoring products. A Branch Circuit Thermal Monitoring System provides an expanded avenue within an ecosystem with monitoring capabilities. By embedding the thermal monitoring system 7 within panel boards, switchboards, switchgears, bus bar systems one enhances product offering from a customer's perspective. The temperature sensor 5 is an important component of the thermal monitoring system 7 and is crucial to the Branch Circuit Thermal Monitoring System.

While a thermocouple-based temperature sensor is described here a range of one or more other types of temperature sensors are also contemplated by the present invention. For example, other types of temperature sensors may be implemented based on one or more features presented above without deviating from the spirit of the present invention. Thermistors are thermally sensitive resistors whose prime function is to exhibit a large, predictable and precise change in electrical resistance when subjected to a corresponding change in body temperature. Resistance thermometers, also called resistance temperature detectors (RTDs), are sensors used to measure temperature. A silicon band-gap temperature sensor is an extremely common form of temperature sensor (thermometer) used in electronic equipment.

The techniques described herein can be particularly useful for a thermal monitoring system for use in power distribution systems. While particular embodiments are described in terms of the thermal monitoring system embedded within panel boards, switchboards, switchgears, bus bar systems, the techniques described herein are not limited to the power distribution systems but can also be used with other systems—digital or analog, circuits or devices.

The ceramic PCB 15 may be a metal core printed circuit board (MCPCB). Ceramic printed circuit boards are a type of metal core PCB. One of the main reasons why one would avoid other PCBs vs. a ceramic circuit board or other MCPCB board has to do with heat transfer. Metal cores like aluminum nitride and beryllium oxide are extremely thermally conductive. Other metal core PCB materials in addition aluminum and beryllium can include copper and steel alloy. Steel alloys provide a stiffness that one will not get with copper and aluminum, but are not as effective at heat transfer. Copper has the best ability to transfer and dissipate heat as part of printed circuit boards, but it is somewhat expensive—so one can opt for aluminum as a cheaper but still highly effective heat-dissipating alternative. The most cost-effective solution will be metal core printed circuit boards with an aluminum base. One gets good rigidity and thermal conductivity at a more reasonable price. The reason metal core PCBs are so much more effective at dissipating heat than fr4 boards is due to their thermal conductivity dielectric material, which serves as a thermal bridge from the IC components to the metal plate, automatically conducting heat through the core to a heat sink. Metal core printed circuit boards are available as single-layer PCBs, single-layer Chip-on-Board PCBs, double-layer PCBs, double-sided PCBs, and multi-layer PCBs.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A temperature sensor of a thermal monitoring system for use in a power distribution system, the temperature sensor comprising:
    a ceramic printed circuit board (PCB) having a first side and a second side,
    wherein the ceramic PCB including a temperature sensing element disposed on the second side of the ceramic PCB;
    a terminal having a first end and a second end,
    wherein the first end of the terminal is configured to be fixed directly in contact with a measured point of an electrical component of the power distribution system and the second end of the terminal is directly in touch with the first side of the ceramic PCB such that heat is conducted from the terminal, through the ceramic PCB and then to the temperature sensing element, and
    wherein the temperature sensing element is configured to generate an electrical signal in response to the heat sensed by the temperature sensor from the electrical component;
    a pair of lead wires, wherein the electrical signal generated by the temperature sensing element is sent through the pair of lead wires to a controller for monitoring a temperature; and
    an epoxy to seal a portion of the terminal, the ceramic PCB in its entirety and a portion of the pair of lead wires to ensure a desired physical strength and a desired dielectric strength.

2. The temperature sensor of claim 1, wherein the terminal comprises a material with high thermal conductivity, the terminal is configured to conduct the heat from the measured point to the temperature sensing element and the terminal provides a means to connect the temperature sensor to the measured point.

3. The temperature sensor of claim 1, wherein the terminal is a ring lug which is configured to be bolted onto the measured point.

4. The temperature sensor of claim 1, wherein the terminal is a cylindrical tube which is configured to be attached to cables with wire ties.

5. The temperature sensor of claim 1, wherein the ceramic PCB provides a dielectric insulation between the terminal being a high voltage part and the temperature sensing element being a low voltage part.

6. The temperature sensor of claim 5, wherein the ceramic PCB provides heat conduction from the terminal to the temperature sensing element.

7. The temperature sensor of claim 1, wherein the ceramic PCB comprises a material with high thermal conductivity.

8. The temperature sensor of claim 7, wherein the material with high thermal conductivity is aluminum nitride.

9. The temperature sensor of claim 1, wherein to ensure good heat conduction both the terminal and the temperature sensing element are directly soldered to the ceramic PCB.

10. The temperature sensor of claim 1, wherein a heat conducting grease is disposed in between the terminal and the ceramic PCB and in between the temperature sensing element and the ceramic PCB.

11. The temperature sensor of claim 1, wherein the temperature sensing element is a thermocouple.

12. The temperature sensor of claim 1, wherein the epoxy is either an insulating epoxy used for sealing or a plastic material in that sealing is done through an injection molding process.

13. The temperature sensor of claim 1, wherein the epoxy serves as a mechanical stress relief when the temperature sensor is being handled.

14. The temperature sensor of claim 1, wherein a portion of the terminal that is inside the epoxy has a holding slot which is filled with epoxy such that when the terminal is pulled the holding slot directly acts on the epoxy instead of relying on a surface bond in order to ensure a force is not acted on a PCB joint.

15. The temperature sensor of claim 1, further comprising:
    a plastic housing disposed around the epoxy.

16. A thermal monitoring system for use in a power distribution system, the thermal monitoring system comprising:
    a controller for temperature monitoring; and
    a temperature sensor coupled to the controller, the temperature sensor including:
        a ceramic printed circuit board (PCB) having a first side and a second side,
        wherein the ceramic PCB including a temperature sensing element disposed on the second side of the ceramic PCB,
        a terminal having a first end and a second end,
        wherein the first end of the terminal is configured to be fixed directly in contact with a measured point of an electrical component of the power distribution system and the second end of the terminal is directly in touch with the first side of the ceramic PCB such that heat is conducted from the terminal, through the ceramic PCB and then to the temperature sensing element, and
        wherein the temperature sensing element is configured to generate an electrical signal in response to the heat sensed by the temperature sensor from the electrical component,
        a pair of lead wires, wherein the electrical signal generated by the temperature sensing element is sent through the pair of lead wires to the controller for monitoring a temperature, and
        an epoxy to seal a portion of the terminal, the ceramic PCB in its entirety and a portion of the pair of lead wires to ensure a desired physical strength and a desired dielectric strength.

17. The thermal monitoring system of claim 16, wherein the terminal comprises a material with high thermal conductivity, the terminal is configured to conduct the heat from the measured point to the temperature sensing element and the terminal provides a means to connect the temperature sensor to the measured point.

18. The thermal monitoring system of claim 16, wherein the terminal is a ring lug which is configured to be bolted onto the measured point.

19. The thermal monitoring system of claim 16, wherein the terminal is a cylindrical tube which is configured to be attached to cables with wire ties.

20. The thermal monitoring system of claim 16, wherein the ceramic PCB provides a dielectric insulation between the terminal being a high voltage part and the temperature sensing element being a low voltage part.

\* \* \* \* \*